United States Patent
Dadheech et al.

(10) Patent No.: US 12,418,057 B2
(45) Date of Patent: Sep. 16, 2025

(54) SYSTEM AND METHOD FOR DETECTING A LITHIUM DENDRITE IN A BATTERY CELL

(71) Applicant: GM GLOBAL TECHNOLOGY OPERATIONS LLC, Detroit, MI (US)

(72) Inventors: Gayatri Vyas Dadheech, Bloomfield Hills, MI (US); Mark W. Verbrugge, Troy, MI (US); Brian J. Koch, Berkley, MI (US); Jing Gao, Rochester, MI (US); Alok Warey, Novi, MI (US)

(73) Assignee: GM Global Technology Operations LLC, Detroit, MI (US)

(*) Notice: Subject to any disclaimer, the term of this patent is extended or adjusted under 35 U.S.C. 154(b) by 821 days.

(21) Appl. No.: 17/666,673

(22) Filed: Feb. 8, 2022

(65) Prior Publication Data
US 2023/0253638 A1    Aug. 10, 2023

(51) Int. Cl.
*H01M 10/48*    (2006.01)
*H01M 4/62*    (2006.01)
*H01M 10/0525*    (2010.01)
*H01M 10/42*    (2006.01)
H01M 50/449    (2021.01)
H01M 50/483    (2021.01)

(52) U.S. Cl.
CPC ............ *H01M 10/48* (2013.01); *H01M 4/62* (2013.01); *H01M 10/0525* (2013.01); *H01M 10/4285* (2013.01); H01M 50/449 (2021.01); H01M 50/483 (2021.01); H01M 2220/20 (2013.01)

(58) Field of Classification Search
CPC ............ H01M 10/42–4285; H01M 10/48–488
See application file for complete search history.

(56) References Cited

FOREIGN PATENT DOCUMENTS

DE    102013224294 A    5/2015

OTHER PUBLICATIONS

DE102013224294A1. English machine translation by EPO. May 28, 2015. (Year: 2015).*

* cited by examiner

*Primary Examiner* — James Lee
(74) *Attorney, Agent, or Firm* — Quinn IP Law (57) ABSTRACT

A system for detecting a lithium dendrite in a battery cell is provided. The system includes the battery cell including an anode and a cathode. The battery cell further includes a conductive prewarning layer disposed between the anode and the cathode and constructed with a porous material. The battery cell further includes a separator layer disposed between the conductive prewarning layer and the cathode, wherein the separator layer is configured for allowing ions to pass through the separator layer. The system further includes a sensor electrically connected to the anode and the conductive prewarning layer and monitoring data related to a voltage potential between the anode and the conductive prewarning layer. The data is useful to identify a decrease in the voltage potential between the anode and the conductive prewarning layer and diagnose existence of the lithium dendrite.

19 Claims, 6 Drawing Sheets

SYSTEM AND METHOD FOR DETECTING A LITHIUM DENDRITE IN A BATTERY CELL

INTRODUCTION

The disclosure generally relates to a system and method for detecting lithium dendrite in a battery cell.

A battery cell includes an anode, a cathode, a separator, and an electrolyte solution. Lithium-ion battery cells generate electrical current through a chemical reaction where lithium ions move from the anode, through the electrolyte, to the cathode. When the battery cell is recharged, this reaction is created in reverse, with lithium ions being moved to the anode. As these lithium ions move back to the anode, lithium is deposited upon the anode. Particularly in rapid charging conditions, this lithium deposit may result in lithium dendrites forming upon the anode.

SUMMARY

A system for detecting a lithium dendrite in a battery cell is provided. The system includes the battery cell including an anode and a cathode. The battery cell further includes a conductive prewarning layer disposed between the anode and the cathode and constructed with a porous material. The battery cell further includes a separator layer disposed between the conductive prewarning layer and the cathode, wherein the separator layer is configured for allowing ions to pass through the separator layer. The system further includes a sensor electrically connected to the anode and the conductive prewarning layer and monitoring data related to a voltage potential between the anode and the conductive prewarning layer. The data is useful to identify a decrease in the voltage potential between the anode and the conductive prewarning layer and diagnose existence of the lithium dendrite.

In some embodiments, the conductive prewarning layer is constructed of one of aluminum, nickel, and tin.

In some embodiments, the battery cell further includes a porous and non-conductive spacer between the anode and the conductive prewarning layer.

In some embodiments, the porous and non-conductive spacer is constructed with a ceramic material.

In some embodiments, the sensor is electrically connected to and receives electrical power through the anode and the cathode.

In some embodiments, the system further includes a computerized warning controller operating programming configured for monitoring the data related to the voltage potential between the anode and the conductive prewarning layer, analyzing the data to identify the decrease in the voltage potential between the anode and the conductive prewarning layer and diagnose the existence of the lithium dendrite, and generating a warning based upon the analyzing.

In some embodiments, the computerized warning controller further includes programming to isolate the battery cell based upon the analyzing.

According to one alternative embodiment, a device including a system for detecting a lithium dendrite in a battery cell is provided. The device includes the battery cell which includes an anode and a cathode. The battery cell further includes a conductive prewarning layer disposed between the anode and the cathode and constructed with a porous material. The battery cell further includes a separator layer disposed between the conductive prewarning layer and the cathode, wherein the separator layer is configured for allowing ions to pass through the separator layer. The device further includes a sensor electrically connected to the anode and the conductive prewarning layer and monitoring data related to a voltage potential between the anode and the conductive prewarning layer. The data is useful to identify a decrease in the voltage potential between the anode and the conductive prewarning layer and diagnose existence of the lithium dendrite.

In some embodiments, the device further comprises a vehicle, and the battery cell is disposed within the vehicle.

In some embodiments, the device further includes a plurality of battery cells and a plurality of sensors. Each of the plurality of sensors is electrically connected to a respective one of the plurality of battery cells. The data is useful to diagnose existence of the lithium dendrite in one of the plurality of battery cells.

In some embodiments, the conductive prewarning layer is constructed of one of aluminum, nickel, and tin.

In some embodiments, the battery cell further includes a porous and non-conductive spacer between the anode and the conductive prewarning layer.

In some embodiments, the porous and non-conductive spacer is constructed with a ceramic material.

In some embodiments, the sensor is electrically connected to and receives electrical power through the anode and the cathode.

In some embodiments, the device further includes a computerized warning controller operating programming configured for monitoring the data related to the voltage potential between the anode and the conductive prewarning layer, analyzing the data to identify the decrease in the voltage potential between the anode and the conductive prewarning layer and diagnose the existence of the lithium dendrite, and generating a warning based upon the analyzing.

In some embodiments, the computerized warning controller further includes programming to isolate the battery cell based upon the analyzing.

According to one alternative embodiment, a method for detecting a lithium dendrite in a battery cell is provided. The method includes operating the battery cell through one of a charging cycle and a discharge cycle. The battery cell includes an anode, a cathode, and a conductive prewarning layer disposed between the anode and the cathode and constructed with a porous material. The battery cell further includes a separator layer disposed between the conductive prewarning layer and the cathode. The separator layer is configured for allowing ions to pass through the separator layer. The method further includes utilizing a sensor electrically connected to the anode and the conductive prewarning layer to monitor data related to a voltage potential between the anode and the conductive prewarning layer, identifying a decrease in the voltage potential between the anode and the conductive prewarning layer, and diagnosing existence of the lithium dendrite based upon identifying the decrease.

In some embodiments, the method further includes providing electrical power to the sensor by electrically connecting the sensor to the anode and the cathode.

The above features and advantages and other features and advantages of the present disclosure are readily apparent from the following detailed description of the best modes for carrying out the disclosure when taken in connection with the accompanying drawings.

DETAILED DESCRIPTION

A lithium-ion battery cell may form dendrites or deposits of dendrite projecting off of a surface of an anode of the battery cell. The anode and the dendrites are electrically conductive. If a dendrite forms an electrical connection between the anode and a cathode of the battery cell, electrical current may flow directly between the anode and the cathode. This condition is similar to a short circuit or a direct, low impedance connection between a positive terminal of the battery cell and a negative terminal of the battery cell. Such an electrical connection created by the dendrite may cause the battery cell to rapidly overheat and cease to function.

A system and method for detecting a lithium dendrite is provided. A conductive prewarning layer may be disposed between the anode and the cathode. As a dendrite grows toward the cathode, the dendrite will come into contact with the conductive prewarning layer before it comes into contact with the cathode. As the dendrite contacts the conductive prewarning layer, a voltage potential between the anode and the conductive prewarning layer is reduced or approaches zero. This electrical connection between the anode and the conductive prewarning layer may be used to diagnose that the battery cell is to be deactivated and taken out of use to avoid the dendrite growing through the conductive prewarning layer and contacting the cathode.

A battery cell includes the anode and the cathode. The battery cell further includes an electrolyte solution and a separator layer between the anode and the cathode. The separator is a permeable membrane which allows ions to pass through the separator as the ions move from the anode to the cathode or from the cathode to the anode. Similarly, the conductive prewarning layer allows ions to pass through the conductive prewarning layer. The conductive prewarning layer may be formed of porous conductive material, such that the electrolyte solution may flow through the porous material.

The anode and the conductive prewarning layer may be some distance apart, wherein the distance is selected to enable operation of the battery cell until a significant dendrite is created. If the distance were too small, an insignificant formation of lithium upon the anode not posing a threat to grow toward and contact the cathode would cause a warning to be generated. By selecting a minimum threshold distance between the anode and the conductive prewarning layer, a dendrite that is forming and growing toward the cathode may be identified. A porous and non-electrically-conductive spacer may be disposed between the anode and the conductive prewarning layer, with the porous and non-electrically-conductive spacer being at least as thick as a minimum threshold distance between the anode and the conductive prewarning layer. The porous and non-electrically-conductive spacer permits the electrolyte solution to flow through the spacer. In one embodiment, the porous and non-electrically-conductive spacer may be constructed of a porous ceramic material.

A sensor may be used to monitor voltage potential between the anode and the conductive prewarning layer. In one embodiment, the sensor may be an application-specific integrated circuit (ASIC).

Figure 1:
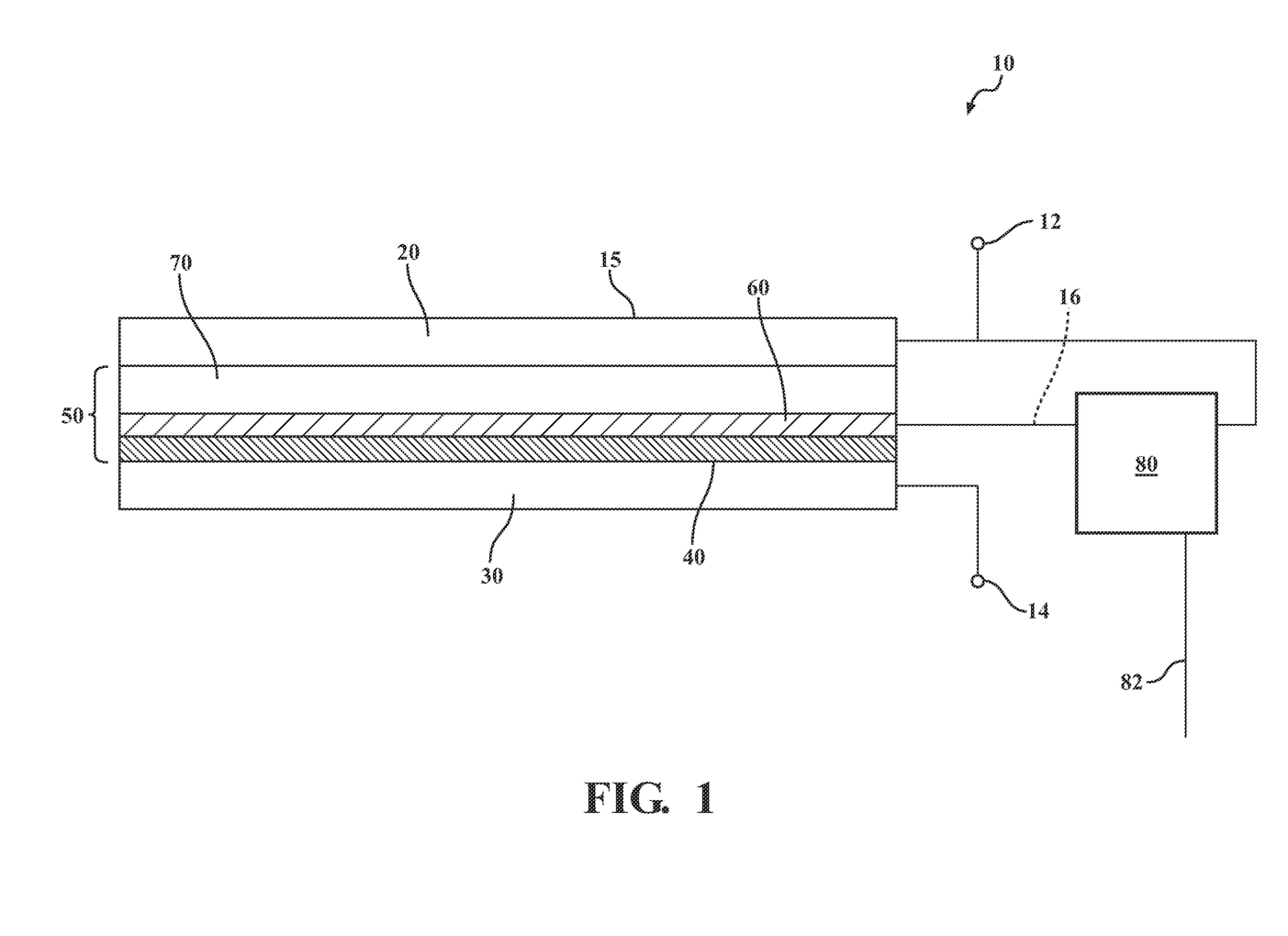
FIG. 1 schematically illustrates an exemplary battery cell including a system for detecting a lithium dendrite, in accordance with the present disclosure.

Referring now to the drawings, wherein like reference numbers refer to like features throughout the several views, FIG. 1 schematically illustrates an exemplary battery cell 15 including a system 10 for detecting a lithium dendrite. The battery cell 15 is illustrated including an anode 20, a cathode 30, a separator layer 40, a conductive prewarning layer 60, and a porous and non-electrically conductive spacer 70. Region 50 is indicated including layers that are inundated with an electrolyte solution and enable ion transfer between the anode 20 and the cathode 30. The anode 20 is connected to a negative terminal 12 of the battery cell 15. The cathode is connected to a positive terminal 14 of the battery cell 15.

A sensor 80 configured for monitoring a voltage potential between the anode 20 and the conductive prewarning layer 60 is electrically connected to the negative terminal 12 and the anode 20 and is additionally electrically connected through electrical connection 16 to the conductive prewarning layer 60. The sensor 80 may generate a stream of data or plurality of values in a series indicating the voltage potential between the anode 20 and the conductive prewarning layer 60. The data or values generated by the sensor 80 may be received and analyzed by a processing device capable of operating programmed code configured for identifying a drop or decrease in voltage potential between the anode 20 and the conductive prewarning layer 60 and issuing a dendrite warning based upon the identification. In the embodiment of FIG. 1, the sensor 80 includes electrical power provided through electrical connection 82.

The conductive prewarning layer 60 may be constructed from a variety of materials. Exemplary materials include aluminum, nickel, and tin.

Figure 2:
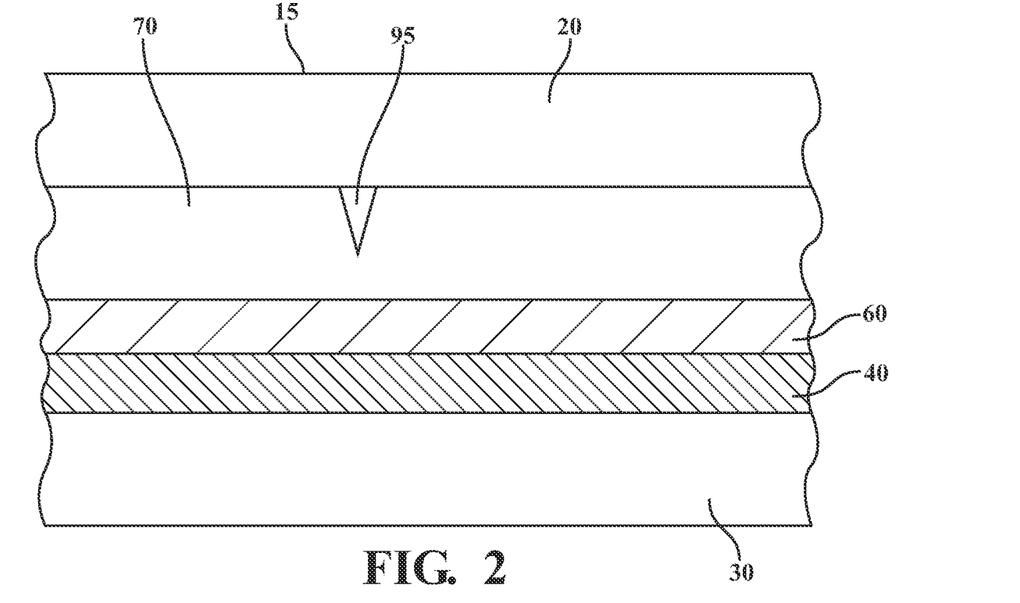
FIG. 2 schematically illustrates in magnified view the battery cell of FIG. 1, including a relatively small dendrite spanning a portion of a distance between the anode of FIG. 1 and the conductive prewarning layer of FIG. 1, in accordance with the present disclosure.

FIG. 2 schematically illustrates in magnified view the battery cell 15 of FIG. 1, including a relatively small dendrite 95 spanning a portion of a distance between the anode 20 and the conductive prewarning layer 60. The battery cell 15 is illustrated including the anode 20, the cathode 30, the separator layer 40, the conductive prewarning layer 60, and the porous and non-electrically conductive spacer 70. The dendrite 95 is illustrated with a base formed upon the anode 20 and with a peak or an appendage growing toward the cathode 30. The dendrite 95 exists within the porous and non-electrically-conductive spacer 70 and does not touch the conductive prewarning layer 60. Because no electrical connection is made between the anode 20 and the conductive prewarning layer 60, no drop or decrease in voltage potential will be evident in sensor readings monitoring a voltage potential between the anode 20 and the conductive prewarning layer 60.

Figure 3:
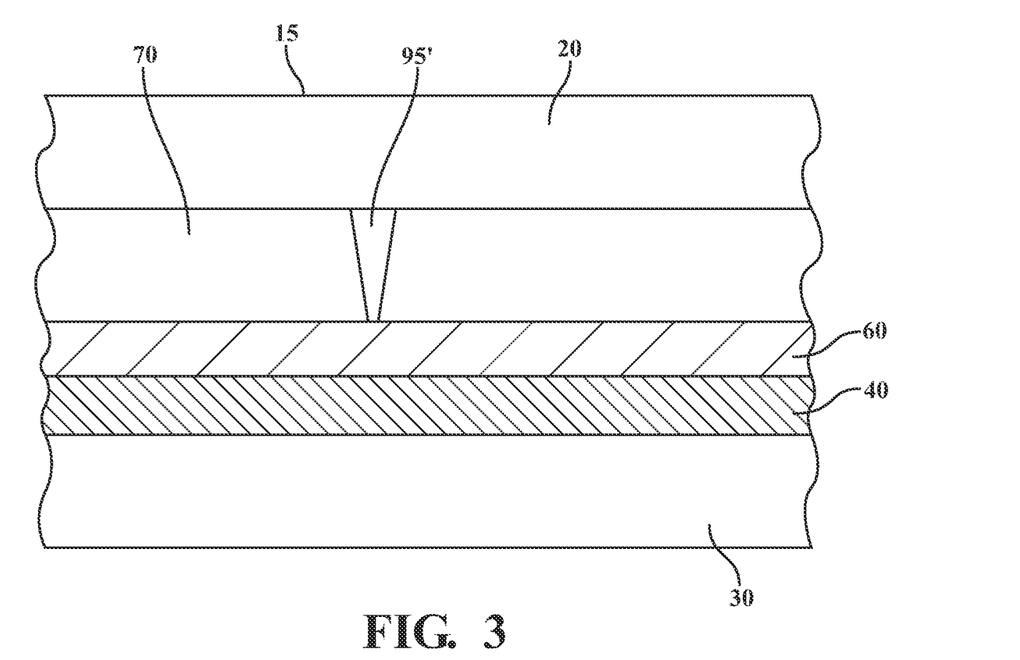
FIG. 3 schematically illustrates in magnified view the battery cell of FIG. 1, including a relatively large dendrite spanning a distance between the anode of FIG. 1 and the conductive prewarning layer of FIG. 1 and creating a conductive path therebetween, in accordance with the present disclosure.

FIG. 3 schematically illustrates in magnified view the battery cell 15 of FIG. 1, including a relatively large dendrite 95' spanning a distance between the anode 20 of FIG. 1 and the conductive prewarning layer 60 of FIG. 1 and creating a conductive path therebetween. The battery cell 15 is illustrated including the anode 20, the cathode 30, the separator layer 40, the conductive prewarning layer 60, and the porous and non-electrically conductive spacer 70. The dendrite 95' is illustrated with a base formed upon the anode 20 and with a peak or an appendage growing toward the cathode 30. The dendrite 95' exists within the porous and non-electrically-conductive spacer 70 and is in electrical contact with the conductive prewarning layer 60. Electrical current may flow between the anode 20 and the conductive prewarning layer 60, such that a drop or decrease in voltage potential will be evident in sensor readings monitoring a voltage potential between the anode 20 and the conductive prewarning layer 60.

Figure 4:
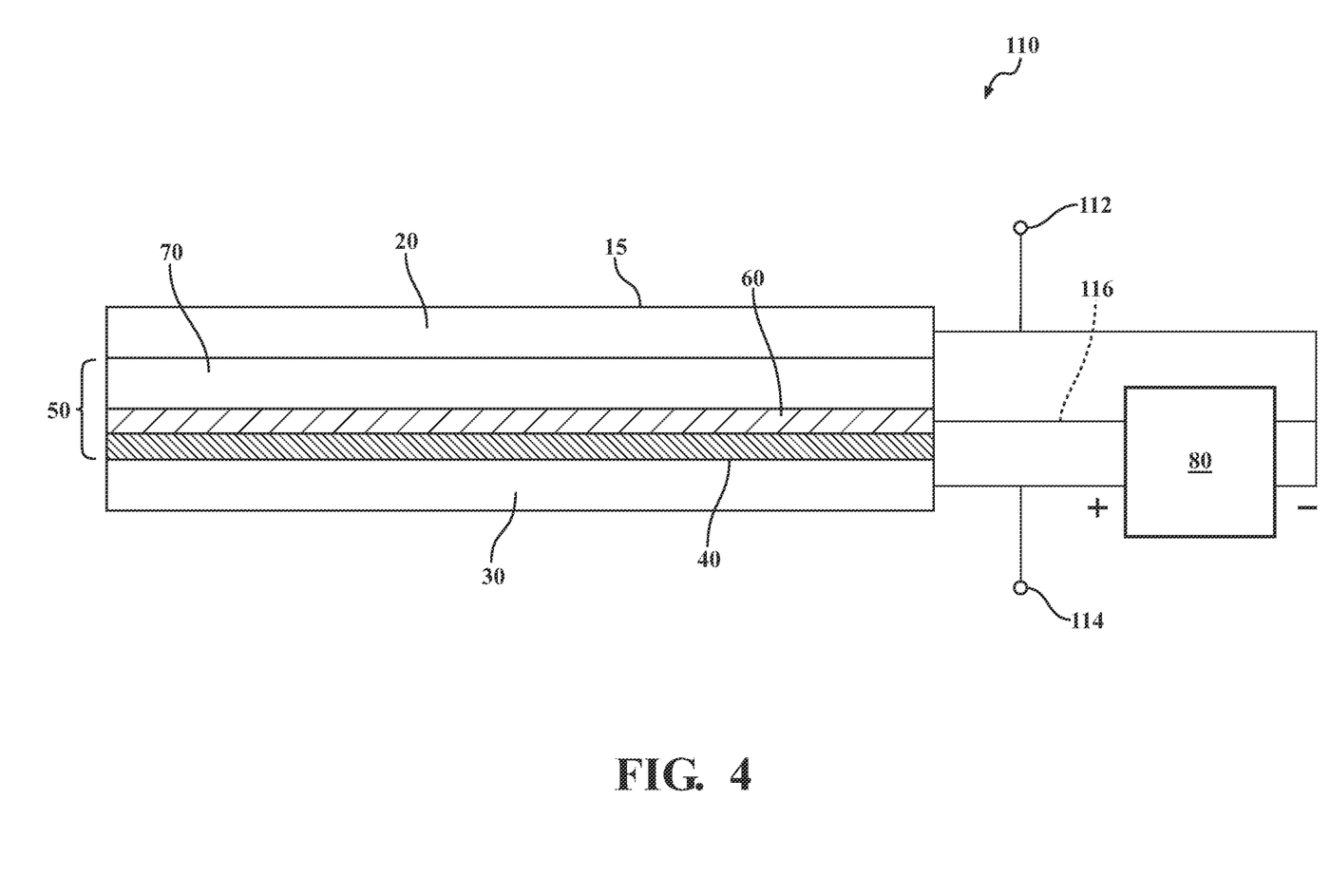
FIG. 4 schematically illustrates an exemplary battery cell including an alternative system for detecting a lithium dendrite, wherein a sensor configured for monitoring a voltage potential between an anode and a conductive prewarning layer receives electrical power to operate from the battery cell, in accordance with the present disclosure.

FIG. 4 schematically illustrates an exemplary battery cell 15 including an alternative system 110 for detecting a lithium dendrite, wherein a sensor 80 configured for monitoring a voltage potential between an anode and a conductive prewarning layer receives electrical power to operate from the battery cell 15. The battery cell 15 is illustrated including an anode 20, a cathode 30, a separator layer 40, a conductive prewarning layer 60, and a porous and non-electrically conductive spacer 70. Region 50 is indicated including layers that are inundated with an electrolyte solution and enable ion transfer between the anode 20 and the cathode 30. The anode 20 is connected to a negative terminal 112 of the battery cell 15. The cathode is connected to a positive terminal 114 of the battery cell 15.

A sensor 80 configured for monitoring a voltage potential between the anode 20 and the conductive prewarning layer 60 is electrically connected to the negative terminal 112 and the anode 20 and is additionally electrically connected through electrical connection 116 to the conductive prewarning layer 60. In addition, the sensor 80 is connected to the negative terminal 112 and the positive terminal 114, such that an electric current may flow through the sensor 80 and power operation of the sensor 80.

Figure 5:
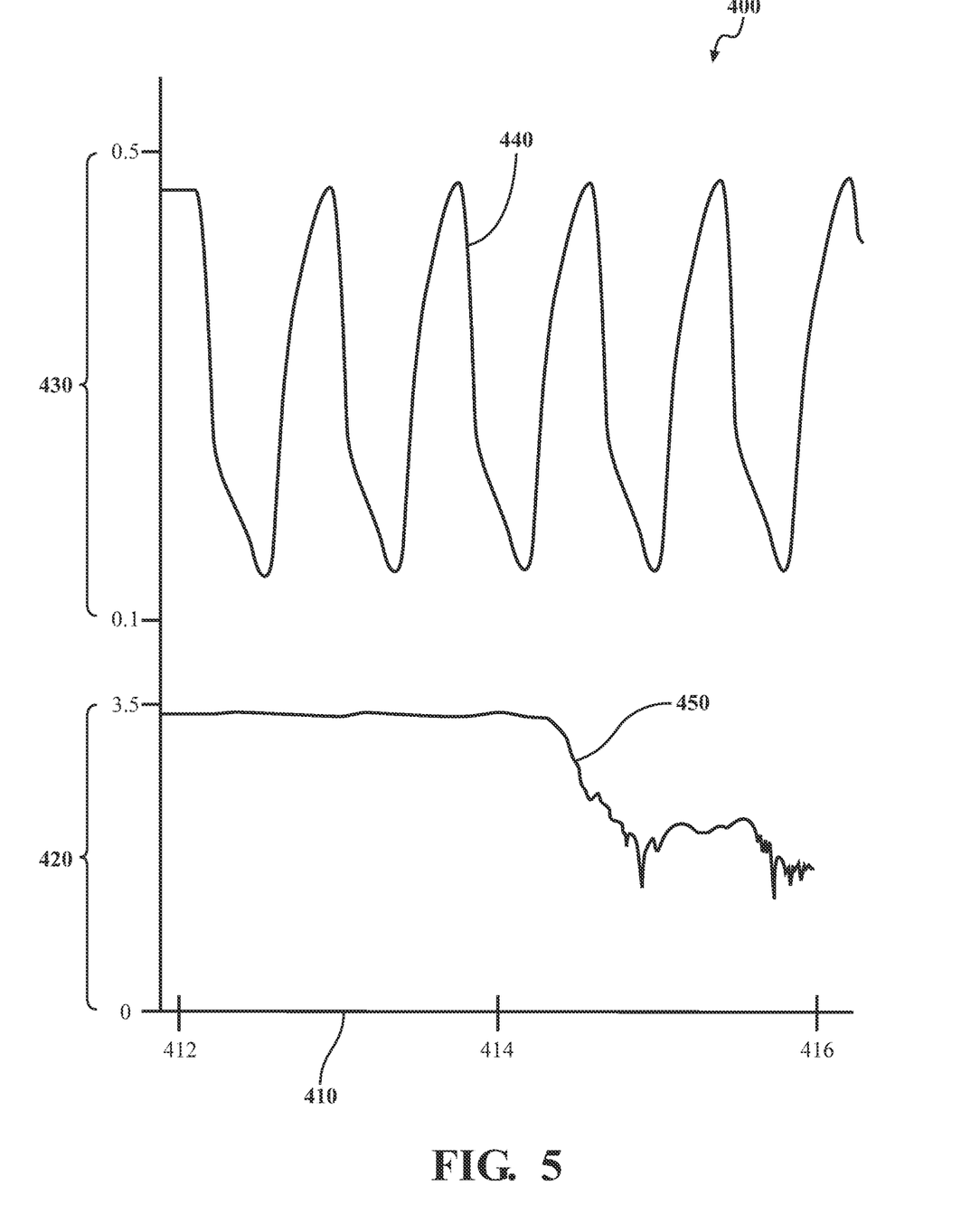
FIG. 5 graphically illustrates through a time period a voltage potential between the anode of FIG. 1 and the cathode of FIG. 1 and further illustrates through the time period a voltage potential between the anode and a conductive prewarning layer of FIG. 1, in accordance with the present disclosure.

FIG. 5 graphically illustrates through a time period a voltage potential between the anode 20 of FIG. 1 and the cathode 30 of FIG. 1 and further illustrates through the time period a voltage potential between the anode 20 and the conductive prewarning layer 60 of FIG. 1. A graph 400 is illustrated including a vertical axis including a first axis portion 420 indicating a voltage potential between the anode 20 and the conductive prewarning layer 60 of the battery cell being tested. The graph 400 further includes the vertical axis including a second axis portion 430 indicating a voltage potential between the anode 20 and the cathode 30 of the battery cell being tested. A horizontal axis 410 illustrates a time period starting at an initial time 412 and ending at a final time 416. A top plot 440 illustrates a voltage potential of the battery cell, measured between the anode 20 and the cathode 30, being tested. One may see that the battery cell goes through a series of discharge cycles where the voltage potential drops and charging cycles where the voltage potential increases. A bottom plot 450 illustrates a voltage potential between the anode 20 and the conductive prewarning layer 60. The bottom plot 450, starting at initial time 412 exhibits a constant or near constant voltage potential. A time 414 between the initial time 412 and the final time 416 is illustrated. At time 414, a dendrite grows to a degree that the dendrite electrically connects the anode 20 to the conductive prewarning layer 60. At time 414, the voltage potential between the anode 20 and the conductive prewarning layer 60 illustrated by the bottom plot 450 begins to drop or decrease, indicating that the dendrite begins to allow current to flow between the anode 20 and the conductive prewarning layer 60. Between time 414 and the final time 416, the voltage potential illustrated by the bottom plot 450 continues to drop or decrease, indicating continued electrical connection between the anode 20 and the conductive prewarning layer 60 and continued growth of the dendrite. One may note that, because the dendrite does not connect the anode 20 and the cathode 30, the top plot 440 shows continued operation of the battery cell through charging cycles and discharging cycles. However, by monitoring the data illustrated by the bottom plot 450, one may clearly diagnose dendrite growth and an increased likelihood that the dendrite would eventually grow to electrically connect the anode 20 and the cathode 30.

Figure 6:
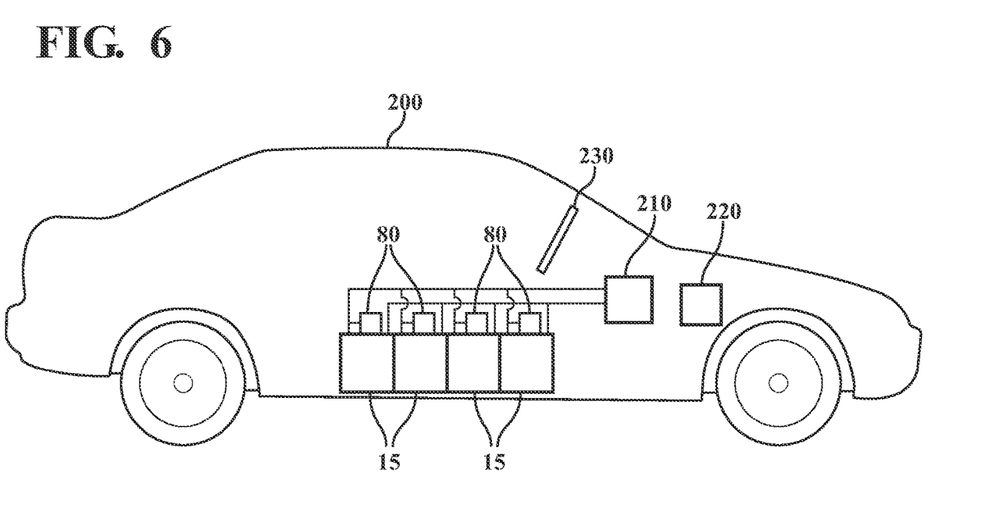
FIG. 6 schematically illustrates a device equipped with a plurality of battery cells including the system for detecting a lithium dendrite and a computerized warning controller configured for warning a user of the device, in accordance with the present disclosure.

FIG. 6 schematically illustrates a device 200 equipped with a plurality of battery cells 15 including the system 10 for detecting a lithium dendrite and a computerized warning controller 220 configured for warning a user of the device 200. A number of devices 200 utilize battery cells 15 and may benefit from a system and method to detect a lithium dendrite. In FIG. 6, the device 200 is embodied as a vehicle. The system 10 includes a plurality of battery cells 15 and a plurality of sensors 80, one sensor 80 monitoring one of the battery cells 15. The battery cells 15 are illustrated electrically connected to a device power system 210 receiving electrical power from the battery cells 15 and providing some output such as motive force to the device 200. The sensors 80 each monitor a voltage potential between an anode and a conductive prewarning layer of a respective one of the battery cells 15. The sensors 80 are in electronic communication with a computerized warning controller 220. The computerized warning controller 220 including programming configured for monitoring data from each of the sensors 80 and diagnosing a battery cell 15 with a dendrite issue based upon monitoring a drop or decrease in voltage potential for the battery cell 15 as disclosed herein. Additionally, a user display device 230 is illustrated which may include a computerized touch screen display. The user display device 230 may convey information to a user of the device 200, such as indicating a warning that one of the battery cells 15 has a dendrite issue, that the battery cell 15 with the dendrite issue has been isolated from operation, and that the user is directed to seek maintenance or is directed to stop the device 200.

The computerized warning controller 220 may include a processor configured to operate programmed code and may operate an operating system. The processor may include random access memory (RAM) and a memory storage device such as a hard drive. The computerized warning controller 220 may including programming to analyze data from the sensor 80 of FIG. 1, diagnose existence of a dendrite based upon the analyzed data, and programming to take further actions, such as to warn a user of a dendrite issue, electrically isolate a battery cell diagnosed to include a dendrite, shut down a device powered by a battery cell diagnosed with a dendrite issue, and automatically schedule a maintenance appointment to have a battery cell with a dendrite issue replaced.

Figure 7:
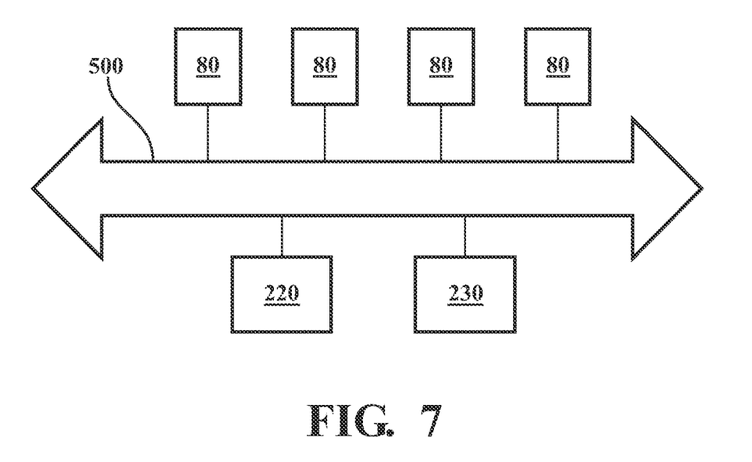
FIG. 7 schematically illustrates an exemplary communications bus configured for enabling electronic communication between electronic components of the device of FIG. 6, in accordance with the present disclosure.

FIG. 7 schematically illustrates an exemplary communications bus 500 configured for enabling electronic communication between electronic components of the device 200 of FIG. 6. FIG. 7 illustrates a plurality of the sensors 80, the computerized warning controller 220, and the user display device 230 electronically connected to the communications bus 500 and transmitting data and computerized commands therethrough.

Figure 8:
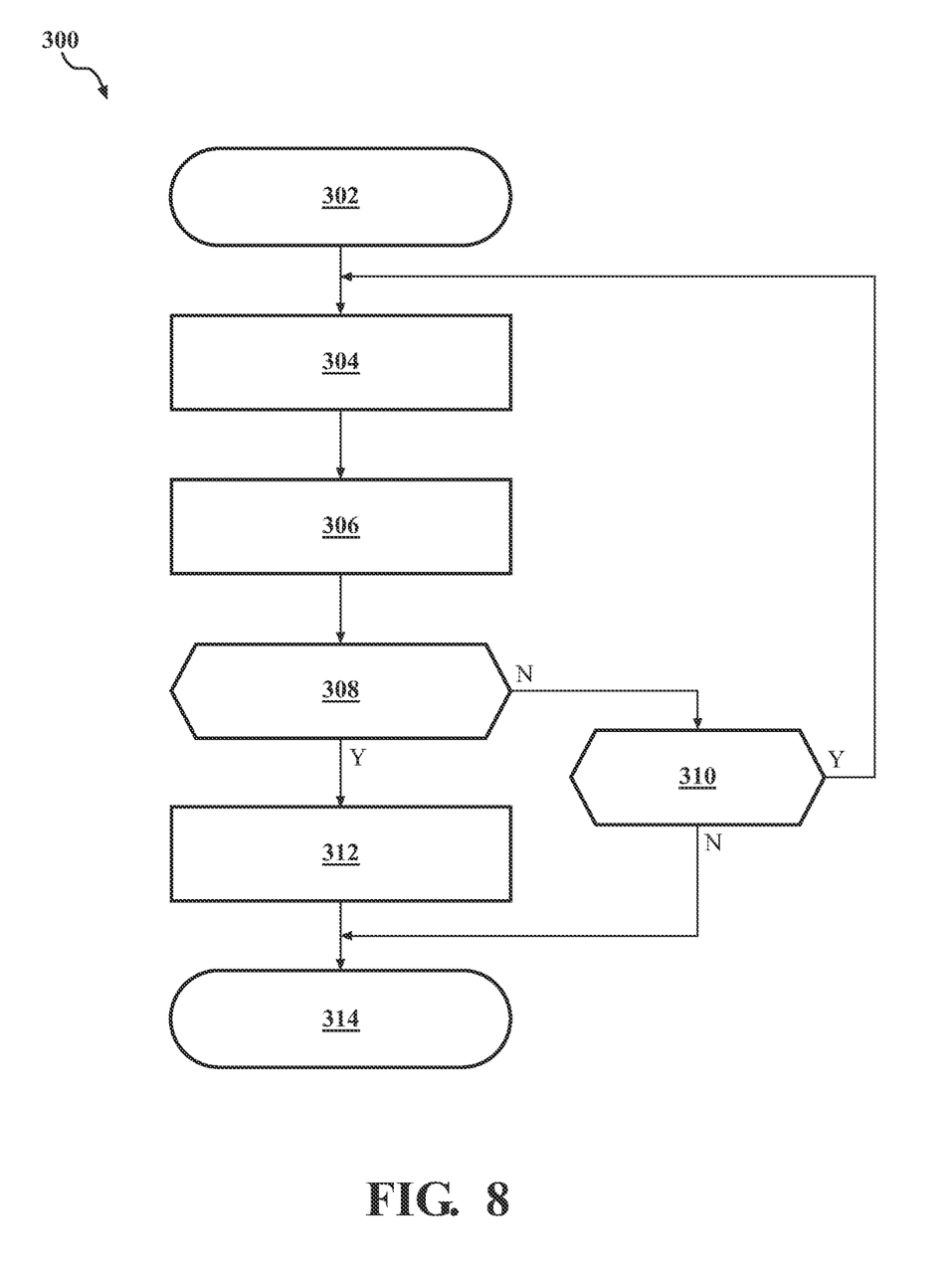
FIG. 8 is a flowchart illustrating an exemplary method to operate a system to detect a lithium dendrite, in accordance with the present disclosure.

FIG. 8 is a flowchart illustrating an exemplary method 300 to operate a system to detect a lithium dendrite. The method 300 starts at step 302. At step 304, the battery cell operates through one of a charging cycle and a discharge cycle. At step 306, a sensor monitors a voltage potential between an anode of the battery cell and a conductive prewarning layer of the battery cell. At step 308, a determination is made whether the voltage potential indicates a drop or decrease in voltage potential consistent with a dendrite creating a conductive connection between the anode and the conductive prewarning layer. If the voltage potential indicates the drop or decrease in voltage potential such that formation of the dendrite is diagnosed, the method 300 advances to step 312. If the voltage potential does not indicate the drop in voltage indicating formation of the dendrite, the method 300 advances to step 310. At step 310, a determination is made whether the battery cell is continuing to be used in either a charging cycle or a discharging cycle. If the battery cell is continuing to be used, the method 300 returns to step 304. If the battery cell is not continuing to be used, the method 300 advances to step 314 where the method 300 ends. At step 312, a warning is indicated to a user of the battery cell that a dendrite has formed. Step 312 may include additional functions, such as initiating a shutdown of the battery cell or a device using the battery cell or initiating an audible alarm. After step 312, the method 300 advances to step 314 where the method 300 ends. A number of additional or alternative method steps are envisioned, and the disclosure is not intended to be limited to the examples provided herein.

While the best modes for carrying out the disclosure have been described in detail, those familiar with the art to which this disclosure relates will recognize various alternative designs and embodiments for practicing the disclosure within the scope of the appended claims.

What is claimed is:

1. A system for detecting a lithium dendrite in a battery cell, the system comprising:
   the battery cell including:
      an anode;
      a cathode;
      a conductive prewarning layer disposed between the anode and the cathode and constructed with a porous material; and
      a separator layer disposed between the conductive prewarning layer and the cathode, wherein the separator layer is configured for allowing ions to pass through the separator layer; and
   a sensor electrically connected to the anode and the conductive prewarning layer and monitoring data related to a voltage potential between the anode and the conductive prewarning layer, wherein the sensor is electrically connected to and receives electrical power through the anode and the cathode; and
   a computerized warning controller configured to:
      monitor the data related to the voltage potential between the anode and the conductive prewarning layer;
      analyze the data to identify a decrease in the voltage potential between the anode and the conductive prewarning layer and diagnose an existence of the lithium dendrite, and
      generate a warning based upon the analyzing, wherein the warning is generated when the decrease includes a voltage potential greater than zero between the anode and the conductive prewarning layer.

2. The system of claim 1, wherein the conductive prewarning layer is constructed of one of aluminum, nickel, and tin.

3. The system of claim 1, wherein the battery cell further includes a porous and non-conductive spacer between the anode and the conductive prewarning layer.

4. The system of claim 3, wherein the porous and non-conductive spacer is constructed with a ceramic material.

5. The system of claim 1, wherein the computerized warning controller further includes programming to isolate the battery cell relative to a plurality of other battery cells in the system based upon the analyzing.

6. The system of claim 1, including a user display configured to display the warning.

7. The system of claim 1, including a porous nonelectrically conductive spacer located between the conductive prewarning layer and the anode, wherein the porous non-electrically conductive spacer, the conductive prewarning layer, and the separator layer are inundated with an electrolyte solution.

8. A device including a system for detecting a lithium dendrite in a battery cell, the device comprising:
   the battery cell including:
      an anode;
      a cathode;
      a conductive prewarning layer disposed between the anode and the cathode and constructed with a porous material; and
      a separator layer disposed between the conductive prewarning layer and the cathode, wherein the separator layer is configured for allowing ions to pass through the separator layer; and
   a sensor electrically connected to the anode and the conductive prewarning layer and monitoring data related to a voltage potential between the anode and the conductive prewarning layer, where in the sensor is electrically connected to and receives electrical power from an external power source separate from the anode and cathode; and
   a computerized warning controller configured to:
      monitor the data related to the voltage potential between the anode and the conductive prewarning layer;
      analyze the data to identify a decrease in the voltage potential between the anode and the conductive prewarning layer and diagnose an existence of the lithium dendrite; and
      generate a warning based upon the analyzing.

9. The device of claim 8, including a vehicle with the device located in the vehicle; and
   wherein the battery cell is disposed within the vehicle.

10. The device of claim 9, wherein the vehicle includes a device power system configured to receive electrical power from the battery cells and provide motive force to the vehicle.

11. The device of claim 9, wherein the vehicle includes a user display configured to display the warning.

12. The device of claim 8, further comprising a plurality of battery cells; and
further comprising a plurality of sensors, wherein each of the plurality of sensors is electrically connected to a respective one of the plurality of battery cells.

13. The device of claim 8, wherein the conductive prewarning layer is constructed of one of aluminum, nickel, and tin.

14. The device of claim 8, wherein the battery cell further includes a porous and non-conductive spacer between the anode and the conductive prewarning layer.

15. The device of claim 14, wherein the porous and non-conductive spacer is constructed with a ceramic material.

16. The device of claim 8, wherein the computerized warning controller further includes programming to isolate the battery cell relative to a plurality of other battery cells in the device based upon the analyzing.

17. The device of claim 8, including a porous nonelectrically conductive spacer located between the conductive prewarning layer and the anode, wherein the porous non-electrically conductive spacer, the conductive prewarning layer, and the separator layer are inundated with an electrolyte solution.

18. The device of claim 8, wherein the warning is generated when the decrease includes a voltage potential greater than zero between the anode and the conductive prewarning layer.

19. The device of claim 18, wherein the conductive prewarning layer is constructed of tin.

* * * * *